United States Patent [19]
van der Lely

[11] Patent Number: 5,718,186
[45] Date of Patent: Feb. 17, 1998

[54] CONSTRUCTION INCLUDING AN IMPLEMENT FOR MILKING ANIMALS

[76] Inventor: Cornelis van der Lely, 7 Brüschenrain, CH-6300 Zug, Switzerland

[21] Appl. No.: 749,248

[22] Filed: Nov. 14, 1996

[30] Foreign Application Priority Data

Nov. 14, 1995 [NL] Netherlands ............... 1001646

[51] Int. Cl.$^6$ ................. A01J 5/017; A01J 5/007
[52] U.S. Cl. ................. 119/14.08; 119/14.03; 119/14.1
[58] Field of Search ............... 119/14.03, 14.08, 119/14.1, 14.18, 14.47

[56] References Cited

U.S. PATENT DOCUMENTS

| | | | |
|---|---|---|---|
| 5,379,722 | 1/1995 | Larson | 119/14.08 |
| 5,634,428 | 6/1997 | Koster | 119/14.1 |

FOREIGN PATENT DOCUMENTS

| | | |
|---|---|---|
| 965034 | 3/1975 | Canada ............... 119/14.08 |
| 0 534 564 | 3/1993 | European Pat. Off. . |
| 0 551 959 | 7/1993 | European Pat. Off. . |

OTHER PUBLICATIONS

International Search Report (PCT) for Netherlands Application No. 1001646, filed Nov. 14, 1995, which is in dutch.

Primary Examiner—Robert P. Swiatek
Assistant Examiner—Elizabeth Shaw
Attorney, Agent, or Firm—Penrose Lucas Albright

[57] ABSTRACT

An apparatus for milking animals which includes one or more milking compartments where the animal is milked, and a milking robot for automatically connecting and disconnecting teat cups to animals being milked in said milking compartments. The milking robot includes a carrier for each teat cup and has a piston and cylinder member that is interconnected to the teat cup by a cord, the cord being played out from the carrier when a teat cup to which it is connected is connected to the animal's teat. The teat cup is pulled back onto a site therefor on the carrier by the piston and cylinder member when the teat cup is disconnected from the animal's teat. A sensor is provided for sensing when a teat cup is not properly pulled back and properly seated at its site therefor. The sensor can be a micro-switch at the site or a micro-switch which is actuated by the piston of the piston and cylinder member when it is fully extended, or it can be mounted on the teat cup and actuated when the teat cup is not at the proper angular disposition which it would have if properly received at its site on the carrier. When a teat cup is not so properly sited after being disconnected or dislodged from an animal's teat, this circumstance indicates a malfunction of which the sensor, via a computer, causes an operator to be notified.

18 Claims, 4 Drawing Sheets

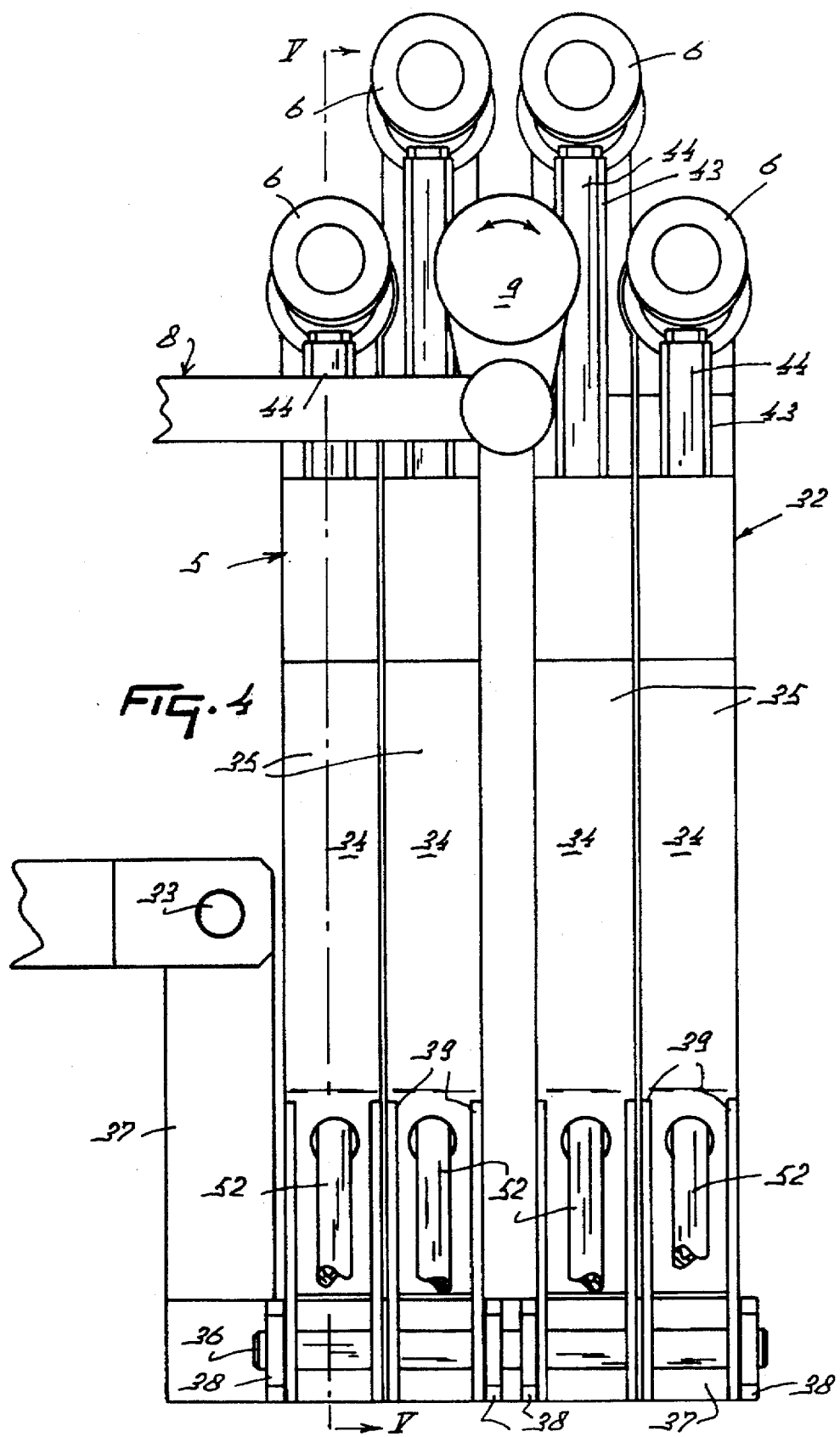

CONSTRUCTION INCLUDING AN IMPLEMENT FOR MILKING ANIMALS

FIELD OF THE INVENTION

The invention relates to an apparatus for milking animals which is provided with one or more milking parlors or, more specifically, compartments where an animal is milked. In particular, it relates to mechanisms for detecting and reacting to dislodgment of a teat cup from an animal's teat before milking is completed.

SUMMARY OF THE INVENTION

Inasmuch as these constructions are operative without a need for the human supervision, it is advantageous that, when disturbances occur in the milking apparatus, they be reported to the person responsible for the operation.

Therefore the invention aims at obtaining a construction of the above-mentioned type, which is provided with means for the operating person to be warned that a disturbance has occurred in the milking apparatus.

In accordance with the invention, this is achieved by the milking apparatus comprising at least one sensor, which supplies a signal to a computer when a teat cup is dislodged from a teat, because, for example, it is kicked and damaged by an animal in the milking parlor. To this end the operating person is apprised, on the basis of computer data, whether or not a teat cup is in working order.

According to an inventive feature, the teat cup is detachably disposed on a carrier and the sensor is provided at a location where the teat cup is carried by the milking apparatus or near thereto. In a preferred embodiment according to the invention, the sensor is disposed in a conical seat of the carrier and the bottom side of the teat cup is conical so as to correspond to configuration of the conical seat. When the teat cup is accidentally displaced from the conical seat and/or has not returned thereto, this circumstance is detected by means of the sensor and a computer, whereafter an operating person is informed that the relevant teat cup is not in an operable condition. In accordance with another invention feature, a sensor is disposed near a withdrawing member, by means of which the teat cup can be drawn towards the carrier, and the sensor supplies a signal to the computer when the withdrawing member is entirely withdrawn. When, after a predetermined period of time, the sensor fails to provide a signal after the computer has transmitted a signal to the withdrawing member to return the teat cup to its seat, the computer thus deduces that the relevant teat cup has not been withdrawn onto the carrier as it should have and consequently is presumably not in working order. According to a further inventive aspect, the withdrawing member comprises a flexible element, such as a cord, which is connected with one end with a teat cup and with the other end with a withdrawing element, such as a piston and cylinder combination. According to a yet further inventive feature, a sensor is activated by the end of the piston rod of the cylinder of the withdrawing member. When a teat cup is withdrawn onto the carrier in a proper manner, the sensor supplies a signal indicating that the withdrawal has been correctly executed. When the end of the piston rod fails to activate the sensor, this means that the relevant teat cup has not returned to the carrier and consequently is in an inoperative condition. According to a still further inventive feature, the sensor is constituted by a micro-switch. In accordance with again another inventive feature, the sensor is disposed on the teat cup. According to another further aspect of the invention, the sensor is constituted by a mercury switch. Said mercury switch is preferably disposed on the casing of a teat cup and provides a signal as soon as the teat cup is pivoted over a predetermined angle such as a minimum of 45° relative to its inoperative position on the carrier. The pivoting of the teat cup about such an angle usually signifies that the teat cup has been kicked or fallen from a teat and, as a result, may fall onto the floor. Upon receiving a signal from the sensor provided on the teat cup, the computer supplies a signal to the withdrawing member for the relevant teat cup to be withdrawn to the carrier as quickly as possible and thus prevent it from falling onto the floor. By means of the sensor on the carrier and/or the sensor near the piston rod, it can be verified whether return of the teat cup to its supporting structure has been correctly executed.

In accordance with an additional inventive feature, the milking apparatus comprises a vacuum sensor capable of determining the vacuum in the vacuum line of the teat cup, which sensor supplies a signal to the computer when a teat cup is disconnected from a teat, whereafter the computer supplies a signal to the vacuum securing means which closes the vacuum line whereby vacuum in the teat cup is disconnected. The aforementioned sensors are in particular advantageously applicable in an automatic milking apparatus including a milking robot. According to a further inventive feature, the apparatus includes a milking robot, by means of which teat cups can automatically be connected from their carrier to the teats of an animal to be milked, and thereafter disconnected therefrom, and returned to the carrier by means of withdrawing members.

DESCRIPTION OF THE DRAWINGS

For a better understanding of the invention and to show how the same may be carried into effect, reference will now be made, by way of example, to the accompanying drawings, in which:

FIG. 4 shows a top plan detail view of a milking robot shown in FIG. 1;

DETAILED DESCRIPTION OF THE PREFERRED EMBODIMENT

Figure 1:
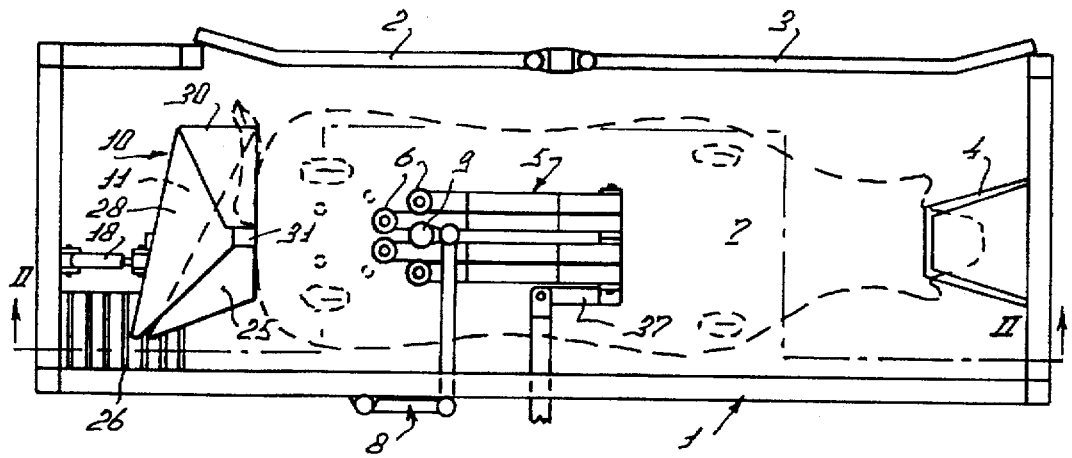
FIG. 1 is a top plan view of an apparatus for milking animals, provided with a milking compartment wherein a cow is illustrated in dashed lines, a milking robot and a collecting member for the cow's dung.
Figure 2:
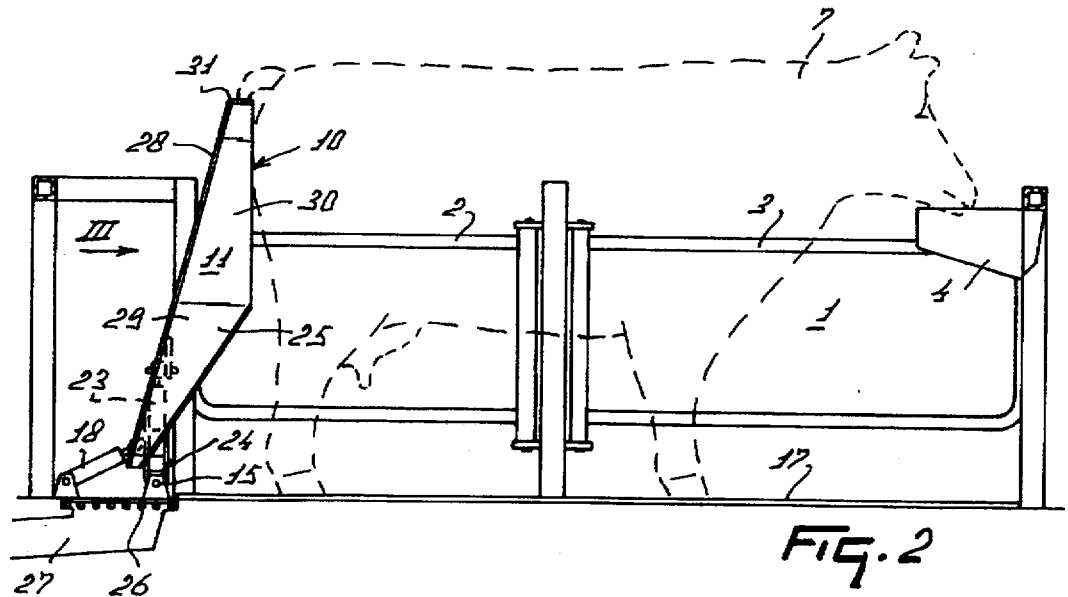
FIG. 2 is a side elevational view of the apparatus shown in FIG. 1.

FIG. 1 shows in a top plan view an apparatus for milking animals, including a milking parlor or compartment 1 provided with an entrance door 2, an exit door 3 and a feed trough 4. At the opposite sides of entrance door 2 and exit door 3, within the framework of milking compartment 1, is arranged a milking robot 5, by means of which teat cups 6 can automatically be connected to the teats of an animal, a cow 7, which is illustrated in dashed lines, and thereafter be disconnected therefrom.

As shown in FIG. 1, near milking robot 5 is a second robot arm 8 provided at its end with a detector 9, by means of which the position of the teats of an animal to be milked can be determined. In the present embodiment, detector 9 is designed as a laser that makes a scanning movement in a horizontal plane. Of course it is also possible to apply another type of detector, such as an ultrasonographic sensor. Milking robot 5 and second robot arm 8 can act independently of each other.

Figure 3:
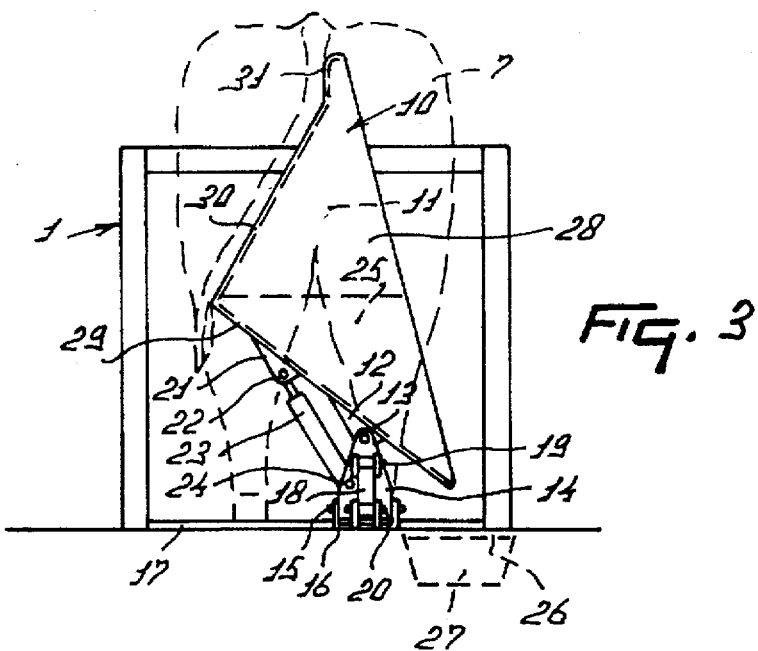
FIG. 3 is a rear elevational view of the apparatus shown in FIGS. 1 and 2.

Near the rear side of milking compartment 1 is a collecting member 10 for collecting the dung of animal 7 (FIG. 3). Collecting member 10 comprises a gutterlike housing 11 which, near its lower side, is provided with a lug 12 that is pivotably connected by a horizontal shaft 13 to a second lug 14. Horizontal shaft 13 extends in the longitudinal direction of milking compartment 1. Second lug 14 is further pivotable about a second horizontal shaft 15, which is disposed in a U-shaped profile 16 that extends transversely to the longitudinal direction of milking compartment 1. U-shaped profile 16 is fastened on floor 17 of milking compartment 1. Between floor 17 and second lug 14 there is further disposed a first piston and cylinder unit 18 extending in the longitudinal direction of milking compartment 1. One end of the first piston and cylinder unit 18 is pivotably connected with second lug 14 about a third horizontal shaft 19 and the other end thereof is pivotably connected with floor 17 about a fourth horizontal shaft 20. The third horizontal shaft 19 and fourth horizontal shaft 20 both extend transversely to the longitudinal direction of milking compartment 1 and are both disposed in U-shaped profiles.

To the gutterlike housing 11 there is fitted a third lug 21 to which, so as to be pivotable about a fifth horizontal shaft 22 extending in the longitudinal direction of milking compartment 1, is attached a second piston and cylinder unit 23. With its other end, the second piston and cylinder unit 23 is connected, so as to be pivotable about a sixth horizontal shaft 24, also extending in the longitudinal direction of the milking compartment 1, with second lug 14.

By means of the first piston and cylinder unit 18, collecting member 10 can be pivoted about the second horizontal shaft 15 in the longitudinal direction of milking compartment 1 and, by means of the second piston and cylinder unit 23, collecting member 10 can be pivoted about the first horizontal shaft 13 in the transverse direction of milking compartment 1.

The gutterlike housing 11 comprises a triangular bottom 25 made of a plate, one point of which extends obliquely downwardly from the cow. Thereby said point of the triangular bottom 25 opens over a grid floor 26 provided in the right rear corner of milking compartment 1. Under grid floor 26 is located a dung discharge gutter 27 connected to a dung cellar (not shown). The horizontally extending upper edge of the triangular bottom 25 extends transversely to the milking compartment 1 and is situated at a height of approximately 1.25 meters. The gutterlike housing 11 furthermore comprises, seen in rear view, the first side 29 of housing 11 is disposed an angle of approximately 140° with the horizontal and the further side 30 which includes an angle of approximately 90° with first side 29. The further side 30 comprises near its upper end a projection 31 including an angle of approximately 30° with the upper part of further side 30.

Collecting member 10 is additionally provided with a cow tracking device (not shown), by means of which milking robot 5 can be post-controlled when animal 7 moves in the longitudinal direction of milking compartment 1.

Figure 6:
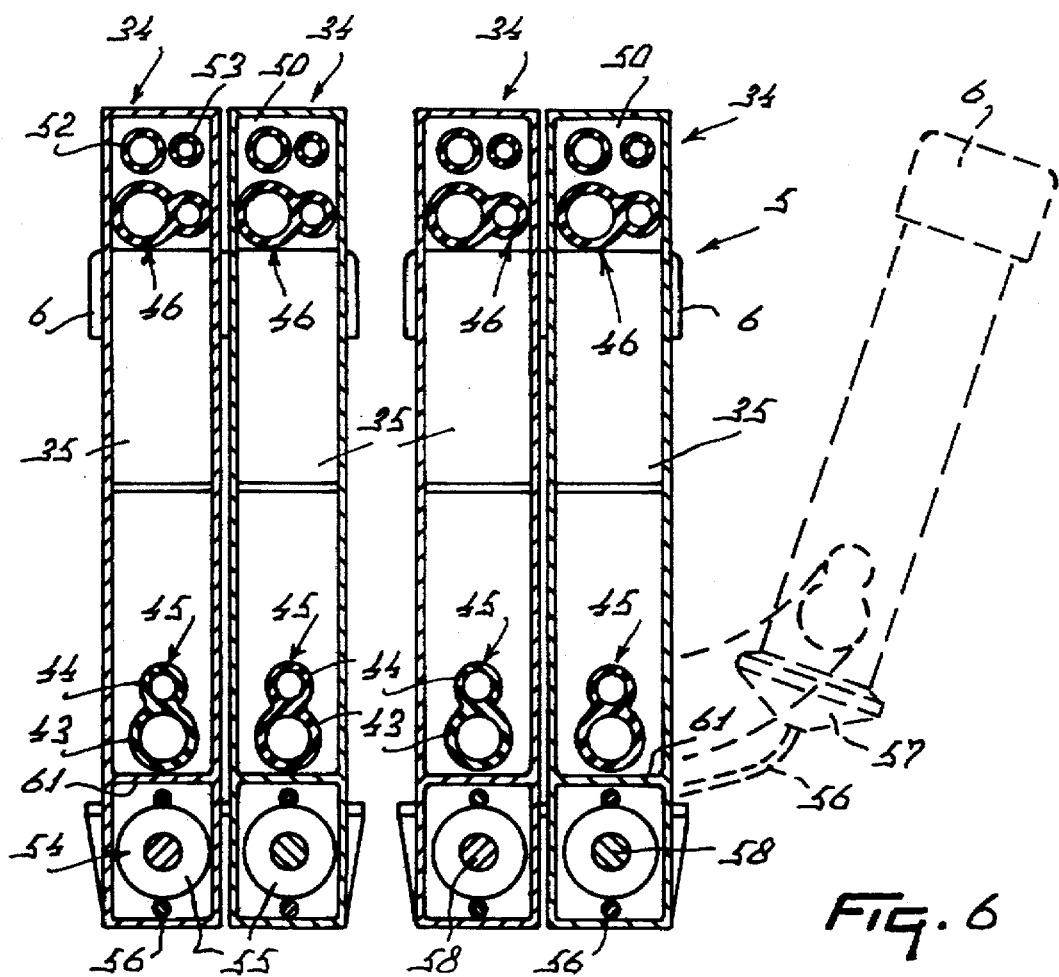
FIG. 6 is a cross-sectional elevational view of the robot arm directed to the rear taken on the line VI—VI in FIG. 5.
Figure 5:
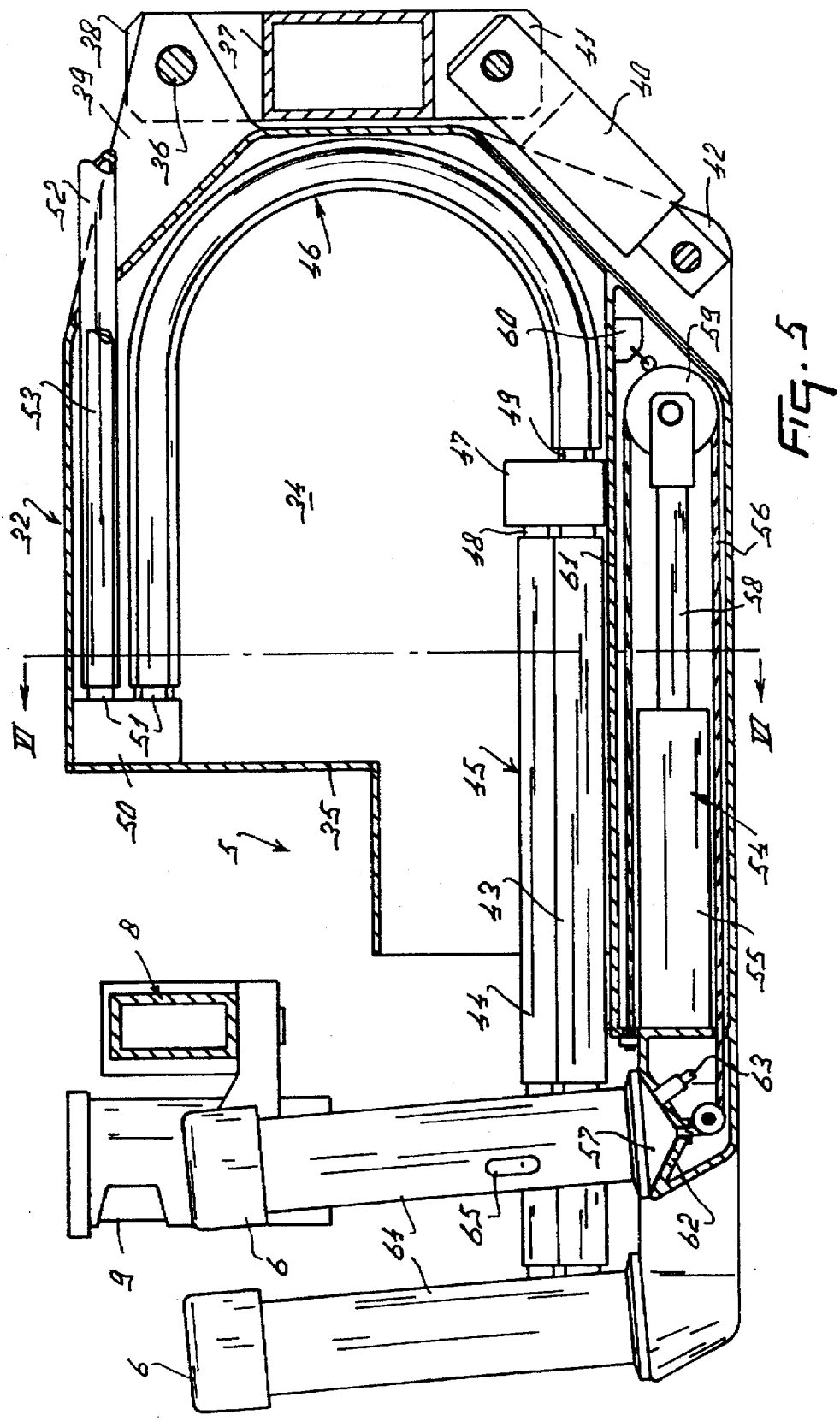
FIG. 5 is a side elevational cross-sectional view of the robot arm taken on the line V—V in FIG. 4.

In FIGS. 4 to 6, the end of milking robot 5 is shown in detail. Teat cups 6 rest on a carrier 32 which is pivotable about a vertical shaft 33. Carrier 32 comprises four juxtaposed units 34 each carrying near an end a teat cup 6. Units 34 each comprise a boxlike housing 35, which is pivotable about a horizontal shaft 36. By means of two juxtaposed U-profiles 38, horizontal shaft 36 is disposed on an L-shaped box girder 37 of milking robot 5. Each unit 35 is provided with two lugs 39 which are pivotably disposed relative to a horizontal shaft 36. Each of units 34 is individually pivotable about horizontal shaft 36 by action of a piston and cylinder member 40. Each piston and cylinder member 40 is connected on one end, by means of lugs 41, with the L-shaped box girder 37 and, on the other end, by means of lugs 42, with the corresponding boxlike housing 35. Piston and cylinder members 40 may be step motors.

Milk tubes 43 and pulsation tubes 44 of teat cups 6 are accommodated in boxlike housing 35. When teat cups 6 rest on carrier 32, milk tubes 43 and pulsation tubes 44 are approximately disposed in a semi-circular arrangement generally within corresponding boxlike housings 35 (FIG. 5). A first part 45 of milk tubes 43 and pulsation tubes 44 extends from a teat cup 6 generally within a vertical plane and a second part 46 of the milk and pulsation tubes comprises a U-shaped part 46 which is located in the same vertical plane. The first and second parts 45 and 46 respectively of tubes 43 and 44 are connected to each other by means of a coupling block 47. The first part 45 of the tubes is connected to connecting nipples 48, which are arranged one below the other at one side of coupling block 47, whereas the second part 46 of the tubes is connected to connecting nipples 49, which are disposed side-by-side at the same level on the other side of coupling block 47. By means of coupling block 47, a kink-free connection is provided between the first part 45, where the tubes are located above each other, and the second part 46, where the tubes are located at the same level next to each other. Both in the first and second parts 45 and 46 of the tubes the jackets of the milk tubes and pulsation tubes 43 and 44 are connected to each other. Furthermore, the jackets of the first part 45 of the tubes are composed of a relatively rigid material, so that teat cup 6 is restrained from being lowered too much. On the other hand, the second part 46 of tubes 43 and 44 is composed of a relatively flexible material. As a result, units 34, without encountering too much resistance from the tubes 43 and 44, can be moved upwardly without the occurrence of kinks. The other end of second part 46 of the tubes is connected with a second coupling block 50, which is provided with two pairs of superposed connecting nipples 51, to which, on the one hand, the end of the second part 46 of the tubes is connected and, on the other hand, a pipelike milk line 52 and a pipelike pulsation line 53 are connected (FIGS. 5 and 6). By means of the second coupling block 50, disposed in the left upper part of boxlike housing 35, a diversion of 180° for the milk and pulsation tubes 43 and 44 is provided. Like the second part 46 of the tubes, the pipelike milk line 52 and the pipelike pulsation line 53 are situated next to each other.

A withdrawing member 54 is disposed in the lower part of each boxlike housing 35, by means of which teat cups 6 can be drawn towards carrier 32. Withdrawing member 54 comprises a piston and cylinder device 55, arranged in the lower part of the corresponding boxlike housing 35. Withdrawing member 54 is additionally provided with a cord 56 which is connected at one end to the corresponding boxlike housing 35 and at the other end to a conical bottom 57 of the teat cup 6. Cord 56 is further guided over a pulley 59 that is rotatably disposed at the end of piston rod 58 of device 55. In the situation shown in FIG. 5, piston rod 58 is fully extended, whereby pulley 59 touches a sensor 60, designed as a switch, which is disposed against a wall 61 of boxlike housing 35. By means of switch 60 it is recorded whether or not cord 56 is fully extended therein so that teat cup 6 properly rests on the carrier 32, the switch 60 thereby transmitting a signal to the computer. When, after a fixed period of time after the piston and cylinder device 55 has been activated, a signal is no longer transmitted from switch 60, device 55 is activated again and, if a signal still is not transmitted from switch 60, the computer provides an error message which, by means such as a radiophone, is passed on to an operating person.

Each of the carriers 32 is provided near its end with a conical seat 62 corresponding to the conical bottom 57 of teat cup 6. Conical seat 62 is thus disposed in carrier 32 so that, when the lower end of carrier 32 is horizontal, a teat cup 6 received on conical seat 62 has a somewhat forwardly inclined position. The angle at which teat cup 6 is positioned relative to the vertical is between approximately 3° and 10° and is preferably 5°. When teat cup 6 is pivoted about shaft 36 by means of the piston and cylinder member 40 in order to be connected to the teat of an animal to be milked, said teat cup 6 assumes a substantially vertical position during pivoting. In this manner it is possible to connect a teat cup 6 to the teat of an animal to be milked by simply pivoting unit 32.

For the purpose of verifying whether, by activating the withdrawing member 54, a teat cup 6 is received in conical seat 62 in a proper manner, a sensor 63 is installed in seat 62 which senses and signals the computer whether the conical bottom 57 of teat cup 6 is correctly received in conical seat 62. Sensor 63 may thereby be designed as a micro-switch or a conductivity sensor. After the computer has transmitted a signal to withdrawing member 54 to withdraw teat cup 6 onto the carrier, the computer verifies that this has occurred, after a predetermined period of time, by reception of a signal from the sensor 63. When no signal is received, it is possible, as described above, to draw the attention of an operating person thereto by means of the computer.

On the outer casing 64 of each teat cup 6 is provided a sensor 65 that transmits a signal to the computer of the angle at which teat cup 6 is positioned relative to the vertical. Sensor 65 may thereby be designed as a clinometer or a simple mercury switch. When teat cup 6 has been pivoted over a pre-set angle, such as 45°, relative to the vertical, the vacuum in the teat cup is automatically removed by the computer and withdrawing member 54 is automatically activated to withdraw teat cup 6 onto conical seat 62, so that teat cup 6 is prevented from falling to floor 17 and becoming dirty. When teat cup 6, after activating the withdrawing member 54, does not return to seat 62 after a predetermined period of time, which is ascertained by sensor 60 and/or sensor 63, this is brought to the attention of an operating person in the above-described manner. In an apparatus of the above-mentioned type, the aforementioned sensors 60, 63 and 65 can operate individually as well as in combination with each other.

Although I have disclosed the preferred embodiment of my invention, it is to be understood that it is capable of other adaptations and modifications within the scope of the following claims.

Having disclosed my invention what I claimed as new and to be secured by Letters Patent of the United States is:

1. An apparatus for milking animals, comprising a milking compartment where an animal can be milked, a robot for automatically milking animals in said milking compartment, a teat cup carried by said robot, disposing means included in said robot for automatically connecting and disconnecting said teat cup to and from a teat of an animal in said milking compartment and at least one sensor which transmits a signal when said teat cup is dislodged from said teat and is not returned by said disposing means to a site therefor provided on said robot.

2. An apparatus in accordance with claim 1, wherein said robot comprises a carrier on which said site for receiving said teat cup is located, said teat cup being detachably disposed on said carrier, and said sensor being disposed at said site.

3. An apparatus in accordance with claim 2, wherein said site comprises a conical seat on said carrier, the bottom of said teat cup having a conical configuration that corresponds to said seat.

4. An apparatus in accordance with claim 1, wherein said disposing means comprises a withdrawing member and a flexible member interconnecting said teat cup with said withdrawing member, said withdrawing member adapted to withdraw said teat cup to said site on said robot, said sensor cooperating with said withdrawing member to signal a computer when said withdrawing member has withdrawn said teat cup via said flexible member to said site.

5. An apparatus in accordance with claim 4, wherein said flexible member comprises a cord, and said withdrawing member comprises a piston and cylinder member, said cord being connected on one end to said teat cup and on the other end to said piston and cylinder member.

6. An apparatus in accordance with claim 5, wherein said sensor is actuated by the piston rod of said piston and cylinder member.

7. An apparatus in accordance with claim 1, wherein said sensor comprises a micro-switch.

8. An apparatus in accordance with claim 1, wherein said sensor is on said teat cup.

9. An apparatus in accordance with claim 8, wherein said sensor comprises a mercury switch.

10. An apparatus in accordance with claim 1, comprising vacuum producing means operably connected to said teat cup, valve means for securing the vacuum in said teat cup generated by said vacuum producing means, a vacuum sensor for determining the vacuum in said teat cup, said vacuum sensor transmitting a signal to a computer when said teat cup is disconnected from a teat, said computer transmitting a signal that shuts off said vacuum producing means in said teat cup.

11. An apparatus for automatically milking animals, comprising a milking robot which includes teat cups and disposing means for automatically connecting said teat cups to the teats of an animal to be milked, said milking robot comprising a carrier which includes a withdrawing member for withdrawing teat cups which have been disconnected from an animal's teats back to said carrier, said carrier including sites for receiving each of said teat cups, the apparatus further comprising sensors that sense when said withdrawing member fails to return any of said teat cups to their corresponding sites.

12. An apparatus in accordance with claim 11, wherein each said sensor is located on each of said sites.

13. An apparatus in accordance with claim 11, wherein said sensor interacts with said withdrawing member.

14. An apparatus in accordance with claim 11, wherein a said sensor is connected to each said teat cup, such sensor detecting the inclination of said teat cup when it is different from such teat cup's inclination when it is properly received at said site.

15. An apparatus for automatically milking animals, which comprises: a milking compartment; a milking robot associated with said milking compartment; said robot including a plurality of carriers; each said carrier including a teat cup, a withdrawing member and a flexible member interconnecting said teat cup and said withdrawing member, and a teat cup site for teat cups which have been fully withdrawn at each said carrier; said withdrawing means moving said teat cups to their corresponding sites when said teat cups are disconnected from their corresponding teats, the apparatus further comprising a sensor, said sensor sensing when a teat cup is not properly received by its corresponding site, and communication means associated with said sensor for informing an operator that a said teat cup has not been properly received at said site.

16. An apparatus in accordance with claim 15, wherein a said sensor is disposed on each said site.

17. An apparatus in accordance with claim 15, wherein said withdrawing member comprises a piston and cylinder member, and each said sensor is actuated by said piston and cylinder member.

18. An apparatus in accordance with claim 15, wherein a said sensor is mounted on each said teat cup.

* * * * *